(12) United States Patent
Madan et al.

(10) Patent No.: US 12,001,410 B2
(45) Date of Patent: Jun. 4, 2024

(54) METHOD AND SYSTEM FOR DETECTING COMPRESSION RATIO ANOMALIES IN DATA STREAMS IN A DEDUPLICATION STORAGE SYSTEM

(71) Applicant: Dell Products L.P., Round Rock, TX (US)

(72) Inventors: Nitin Madan, Cupertino, CA (US); Bhimsen Bhanjois, Fremont, CA (US); Senthil Ponnuswamy, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 121 days.

(21) Appl. No.: 17/684,751

(22) Filed: Mar. 2, 2022

(65) Prior Publication Data
US 2023/0281174 A1 Sep. 7, 2023

(51) Int. Cl.
*G06F 16/215* (2019.01)

(52) U.S. Cl.
CPC ................ *G06F 16/215* (2019.01)

(58) Field of Classification Search
CPC .................................................. G06F 16/215
See application file for complete search history.

(56) References Cited

U.S. PATENT DOCUMENTS

| | | | |
|---|---|---|---|
| 8,566,286 B1* | 10/2013 | Hawton | G06F 11/1458 707/654 |
| 9,454,321 B1* | 9/2016 | Smaldone | G06F 3/061 |
| 10,735,462 B2* | 8/2020 | Sheri | G06F 21/64 |
| 2016/0292589 A1* | 10/2016 | Taylor, Jr. | G06T 9/002 |
| 2017/0357457 A1* | 12/2017 | Bushman | G06F 11/1464 |
| 2020/0085330 A1* | 3/2020 | Di Poian | A61B 5/318 |
| 2022/0187841 A1* | 6/2022 | Ebrahimi Afrouzi | G05D 1/0242 |

* cited by examiner

*Primary Examiner* — Maher N Algibhah
(74) *Attorney, Agent, or Firm* — WOMBLE BOND DICKINSON (US) LLP (57) ABSTRACT

This disclosure provides system, methods, and media for identifying inadvertent compression or encryption in data streams from a client that land on a deduplication storage system. When one or more such abnormalities are detected, an alert message is generated to alert the administrator of the deduplication storage system so that corrective actions can be taken to prevent undesired consequences. According to an exemplary method, machine learning techniques are used to plot and smoothen global compression ratios and local compression ratios of historical backups from a client over a period of time. Then, a second derivative of each data point on the smoothened curves is taken and compared with a predetermined threshold to detect whether that the slope of the data point exceeds a threshold. A data point whose slope exceeds the threshold can be determined to be a data point corresponding to a backup that includes compression and/or encryption.

14 Claims, 7 Drawing Sheets

METHOD AND SYSTEM FOR DETECTING COMPRESSION RATIO ANOMALIES IN DATA STREAMS IN A DEDUPLICATION STORAGE SYSTEM

FIELD OF THE INVENTION

Embodiments of the present invention relate generally to data storage systems. More particularly, embodiments of the invention relate to detecting abnormal patterns in compression in an incoming data stream to in a storage system.

BACKGROUND

A data storage system, such as the PowerProtect Data Manager (PPDM) from Dell EMC™, receives data from multiple clients, and stores the data in a deduplication storage system.

In such a storage system, data streams are to go through a deduplication process, which is a method of data compression to enable repeated data segments to point to a same segment on a disk in the deduplication storage system. However, if the data streams are encrypted or compressed, the deduplication would yield near zero data compression.

Typically, a data storage system may involve one or more client administrators and a deduplication system administrator, and the client administrators may not always be able to communicate encryption or compression changes in the data streams to the deduplication storage system administrator. For example, if the encryption or compression in the data steams is inadvertent or caused by ransomware, the client administers may not be aware of the encryption or compression in the data streams, and thus cannot notify the deduplication storage system administrator of the changes in the data streams.

As a result, the deduplication storage system may not detect the data encryption or compression in the data streams until days or weeks later through decreased compression ratios in the deduplication storage system, and thus would not be able to take timely actions to prevent associated undesired consequences, which include altered service level parameters (e.g., service level agreement, capacity utilization, and time to transmit the data to a remote site).

Thus, it would be desirable for the deduplication storage system to detect the compression and/or encryption in data streams so that appropriate corrective actions can be taken in time when the compression or encryption is inadvertent.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to various embodiments, machine learning algorithms are used to monitor data streams as they land on a deduplication storage system to track anomalies in global compression ratios (i.e. deduplication ratios) and local compression ratios for each data stream of every client that has data to be backed up on the duplication storage system.

When one or more such abnormalities are detected, an alert message is generated to alert the administrator of the deduplication storage system so that corrective actions can be taken to prevent undesired consequences.

According to an exemplary method, machine learning techniques are used to plot and smoothen global compression ratios and local compression ratios over a period of time in the past from a particular client. Then, a second derivative of each data point on the smoothened curves is taken and compared with a predetermined threshold to detect whether that data point is an abnormality.

In one embodiment, an exemplary method includes retrieving global compression ratios of historical backups of a source system of a client and local compression ratios of the source system over a predetermined period of time; plotting a first curve using the global compression ratios and a second curve using the local compression ratios; and smoothening the first curve and the second curve using a predetermined smoothening algorithm to generate a first smoothened curve and a second smoothened curve. The method further includes finding a second derivative of each data point on each of the first smoothened curve and the second smoothened curve; and identifying one or more data points whose slopes exceed a predetermined threshold on the first smoothened curve and the second smoothened curve.

In one embodiment, the method further includes generating an alert message for an administrator of the client and/or an administrator of the deduplication storage system. The message for the administrator of the deduplication storage system can be displayed on a graphical user interface on the deduplication storage system. The alert messages can inform the client administrator or the deduplication storage system that a compression function or an encryption function has been enabled on the client.

In on embodiment, a variety of smoothening algorithms can be used to smoothen the compression ratio curves. The smoothening algorithms can include Savitzky-Golay filter, kernel density estimation, and quadratic planning (QP) spline optimization.

In one embodiment, the threshold value used to detect whether a data point on the smoothened curves is an abnormality is configurable. In one embodiment, the compression ratios used to plot the compression ratio curves are stored as part of the metadata of backups on the deduplication storage system, and can cover a particular period of time (e.g., 10 days).

The embodiments described above are not exhaustive of all aspects of the present invention. It is contemplated that the invention includes all embodiments that can be practiced from all suitable combinations of the various embodiments summarized above, and also those disclosed below.

Deduplication Storage System

Figure 1:
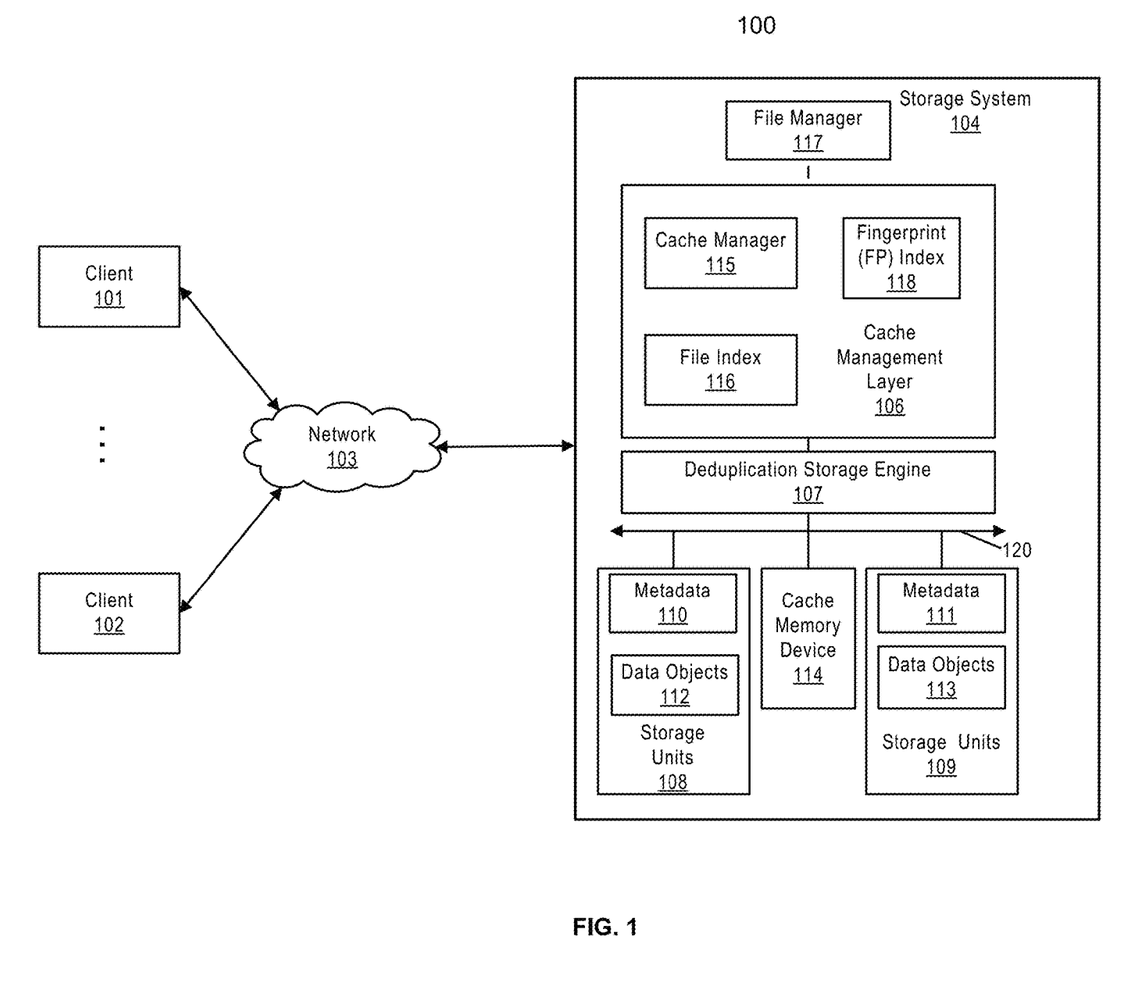
FIG. 1 is a block diagram illustrating a deduplication storage system according to one embodiment of the invention.

FIG. 1 is a block diagram illustrating a deduplication storage system 100 according to one embodiment of the invention. The deduplication storage system 100 includes, but is not limited to, one or more client systems, such as client 101 and/or client 102, which are communicatively coupled to the storage system 104 over the network 103. The clients 101, 102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of the clients 101, 102 may be a primary storage system that provides storage to other local clients, which may periodically back up the content stored therein to a backup storage system, such as the storage system 104. The network 103 may be any type of networks such as a local area network (LAN), a wide area network (WAN) such as the Internet, a fiber network, a storage network, or a combination thereof, wired or wireless. The clients 101, 102 may be in physical proximity or may be physically remote from one another. The storage system 104 may be located in proximity to one, both, or neither of the clients 101, 102.

The storage system 104 may be used as any type of server or cluster of servers. For example, the storage system 104 may be a storage server used for any of various different purposes, such as to provide multiple users with access to shared data and/or to back up data (e.g., mission critical data). In one embodiment, storage system 104 includes, but is not limited to, a file manager 117, a cache management layer 106, a deduplication storage engine 107, storage units 108, 109, and a cache memory device 114 communicatively coupled to each other. The storage units 108, 109 and the cache memory device 114 may be implemented locally (e.g., single node operating environment) or remotely (e.g., multi-node operating environment) via interconnect 120, which may be a bus and/or a network (e.g., a storage network or a network similar to network 103). The storage units 108, 109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. The cache memory device 114 can include one or more of volatile, non-volatile, or a combination of volatile and non-volatile devices.

The file manager 117 may be executed by a processor to provide an interface to access files stored in the storage units 108, 109 and the cache memory device 114. The cache management layer 106 contains a cache manager 115, file index 116, and optionally a fingerprint (FP) index 118. Cache management layer 106 and file manager 117 reside in memory of a processor in one embodiment.

In one embodiment, the file index 116 is used to access data cached in cache memory device 114. The fingerprint index 118 is used to de-duplicate data stored in cache memory device 114 and the storage units 108, 109. In one embodiment the fingerprint index 118 is a partial index that covers a portion of data stored in the cache memory device and/or storage units 108, 109, with the remainder of the fingerprint data stored in the metadata 110, 111 of an associated one of the storage units 108, 109. In one embodiment, the metadata 110, 111 includes a file name, a storage unit where the segments associated with the file name are stored, reconstruction information for the file using the segments, and any other appropriate metadata information related to the files and underlying data objects on each storage unit.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of all storage units associated with the storage system in the event that the main metadata is lost, corrupted, damaged, etc. Metadata for a storage unit can be reconstructed using metadata information stored on a main storage unit or other storage unit or units (e.g., replica storage unit). Metadata information further includes index information (e.g., location information for segments in storage units). In one embodiment, metadata includes prime segment information that can be used to provide a consistent point of a file system and/or reconstruct a file system in the event of file system failure.

When data is to be stored in the storage units 108, 109, the deduplication storage engine 107 is configured to segment the file data into multiple chunks (also referred to as segments) according to a variety of segmentation policies or rules. The deduplication storage engine 107 may choose not to store a chunk in a storage unit if the chunk has been previously stored in the storage unit. In the event that the deduplication storage engine 107 does not to store the chunk in the storage unit, the deduplication storage engine 107 can store metadata enabling the reconstruction of the file using the previously stored chunk. As a result, chunks of file data are stored in a deduplicated manner as data objects 112, 113 within one or more of the storage units 108, 109. The metadata 110, 111 may be stored in at least some of storage units 108, 109, such that files and associated data objects 112, 113 in a storage unit can be accessed independently of another storage unit. In general, the metadata of each storage unit includes sufficient information to provide access to the files that are backed by the data objects 112, 113 on the storage unit.

Figure 2:
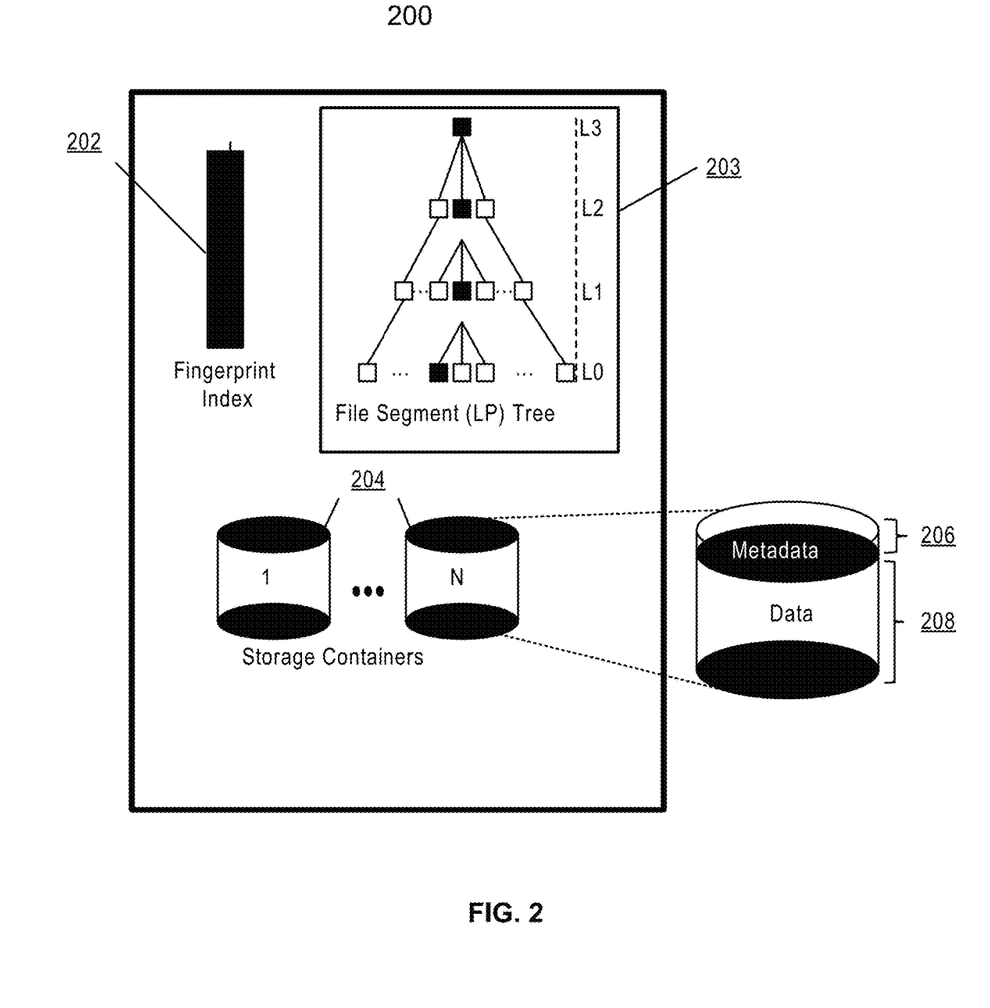
FIG. 2 illustrates a deduplication file system, according to an embodiment of the invention.

FIG. 2 illustrates a deduplication file system 200, according to an embodiment. The deduplication file system includes a fingerprint index 202, such as the fingerprint index 218 of FIG. 2, a file segment tree 203, and one or more storage containers 204 including metadata 206 and data 208. One or more of the storage containers 204 can be stored on each of the storage units 108, 109 of FIG. 1. The metadata 206 can contain at least a portion of the metadata 110, 111 of FIG. 1. The data 208 can contain at least a portion of the data objects 112, 113 of FIG. 1.

In one embodiment the fingerprint index 202 is a portion of the metadata 206 on the storage containers 204 and at least a portion of the fingerprint index 202 is stored or cached in memory. The fingerprint index 202 stores information to determine which of the storage containers 204 on which data referenced by a fingerprint is stored. In one embodiment the fingerprint index 202 stores fingerprint data in the form of fingerprint and container identifier pairs (e.g., <FP,CID>) which associate a fingerprint with a container identifier storing the storage segment associated with the fingerprint.

The file segment tree 203 is a portion of the metadata 206 that enables the deduplication file system 200 to reconstruct a file from the underlying data 208. The file segment tree 203 may be referred to as an LP segment tree. In one embodiment the file segment tree 203 is a Merkle tree that may have multiple levels depending on the size of the file. The level zero (L0) segments of the tree are segments with user data. Each L0 segment is identified by a fingerprint, which is one of the fingerprints stored in the fingerprint index 202. The fingerprints are content based fingerprints, such as a hash of the L0 data segment. A level one (L1) segment references one or more L0 segments via content based fingerprints. One or more L1 segments can then be referenced by a level 2 (L2) segment, up to the root node of the tree. Accordingly, the L0 segments contain the data 208 within the storage containers 204. In some embodiments segments in layers L1 and up, referred to as LP segments are also stored in the data 208 and each LP segment also has an associated stored in the metadata 206 and in the fingerprint index 202. Segments can be shared among multiple files and in one embodiment may be compressed and packed within a compression region. Multiple compression regions may be packed into a storage container.

Compression or Encryption Abnormality Detection

As described above, a file data to be stored in a deduplication storage system needs to go through a deduplication process for identifying redundant data segments of the file data such that only unique data segments are compressed and stored in the deduplication storage system.

In the deduplication process, the file data, which is transmitted from a client to the storage system via a data stream, can be segmented using two different techniques: fixed sized segmentation (FSS) and variable sized segmentation (VSS). Under the FSS, the file data can be segmented at fixed sized boundaries (e.g., 8 KB). This technique is typically used for applications that do not have data shifts, such as a primary storage logical unit number (LUN), or a virtual machine (VM) file. Under the VSS, the file data can be segmented at an arbitrary boundary (within bounds).

A propriety algorithm can be used to create data segments between 4 kB and 12 kB, with the average size being 8 kB. Once the file data has been segmented, it is fingerprinted. A storage system (e.g., the storage system 104) can use a mutation of the SHA1 algorithm to create the fingerprint. This fingerprint can be looked up in a fingerprint index (e.g., the fingerprint index 118). If the segment does not exist on the storage system, the segment must be written to a disk. Before writing the segment to the disk, the segment of the data can be compressed using a data compression algorithm (like LZ, or GZ). To achieve decent compression ratios, the compression can be performed multiple segments, which are written as a compression region (within a container).

The deduplication process is a process of identifying and compressing unique data segments in data streams. As used herein, unique data segments are those that cannot be located on the storage system using the fingerprint lookup operation mentioned above. Once the unique data segments are identified, they can be compressed and stored to the storage system. Thus, the deduplication is also referred to global compression, and the operation of compressing unique data segments is also called local compression. Since the global compression comprises identifying unique data segments and compressing the unique data segments, the local compression is part of the global compression.

However, if the file data is pre-compressed, re-compressing it yields no benefit. In some cases, the recompression would actually increase the size of the buffer. Similarly, if the file data is encrypted, the compression also would not yield benefit because the entropy of the data may, in some cases, cause an increase in the size of the compressed buffer. Encryption can cause a huge change in the entropy of the data due to the design of encryption algorithms.

With the VSS segmenting technique, the encrypted data stream would look like brand new data, and therefore, there would be no deduplication associated with the data stream. With the FSS technique, there can be two cases. In the first case where the encryption is performed at a segment boundary, unique data segments (changed data segments) would appear as completely new data, and unchanged data segments would land on the file system as encrypted and would be identified as redundant. Thus, in the first case, although the data stream is encrypted, deduplication may occur due to the presence of the unchanged data segments. In the second chase where the encryption is performed for the entire data stream, the entropy associated with encryption would kick in, and no segment in the entire data stream would get any duplication or compression benefits.

Thus, when an incoming data stream to a storage system is encrypted or compressed, the compressions (global and local) performed on the data stream in the storage system would yield zero or little benefits. Such features in encrypted data or compressed data would allow abnormalities in compression and/encryption to be detected based historical data streams.

Figure 3:
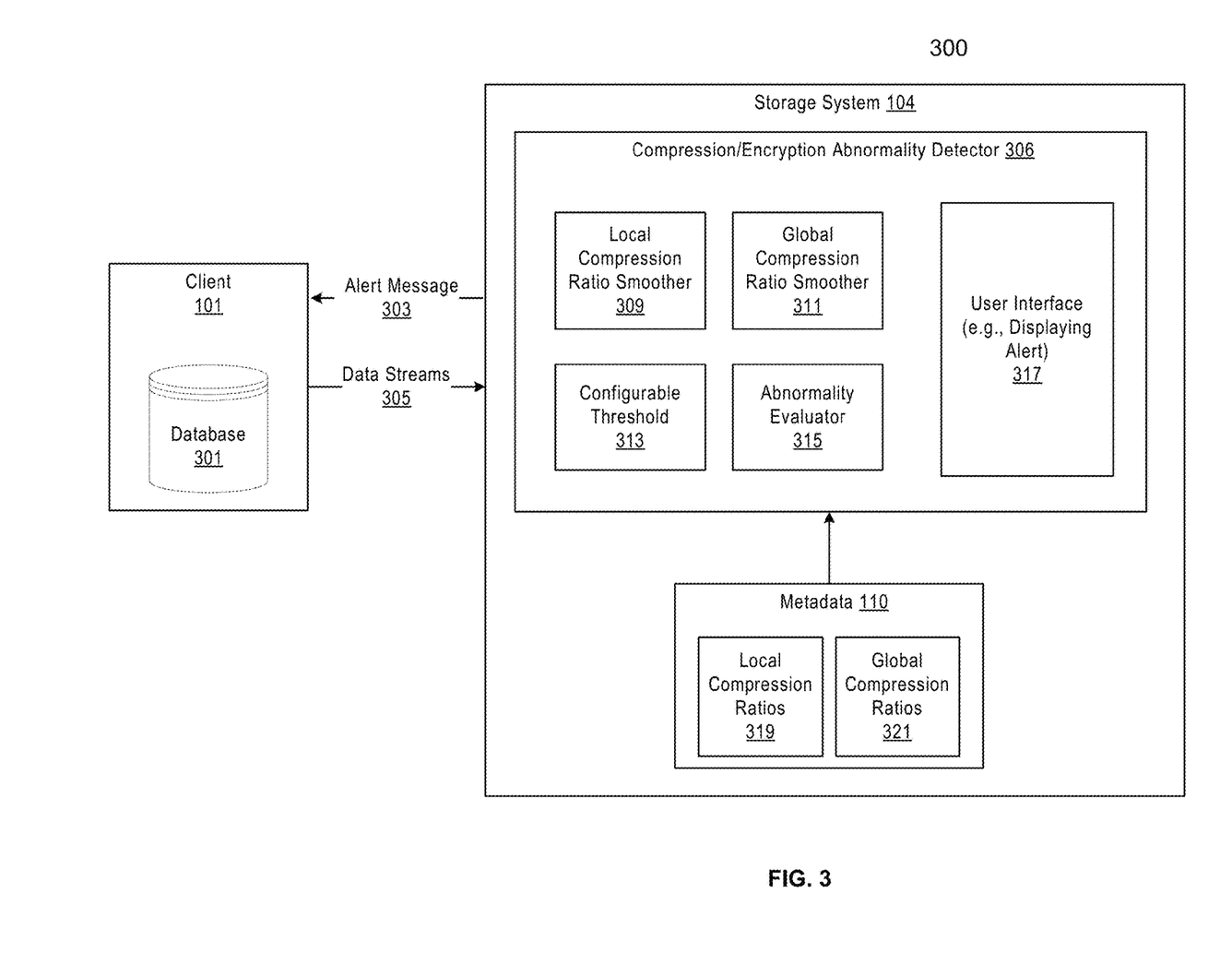
FIG. 3 is a block diagram illustrating a deduplication storage system for detecting abnormalities in data streams according to one embodiment of the invention.

FIG. 3 is a block diagram illustrating a deduplication storage system 300 for detecting abnormalities in data streams according to one embodiment of the invention.

More specifically, FIG. 3 illustrates a deduplication storage system for detecting abnormalities in data streams using machine learning techniques based on metadata of backups stored in the storage system.

As shown in FIG. 3, a compression/encryption abnormality detector 306 can be provided in the storage system 104 to detect abnormalities in compression ratios in data streams that have been stored in the storage system 104 for various clients. The embodiment illustrated in FIG. 3 focuses on client 101, which can be a database system 301. However, a person skilled in the art would appreciate that the features illustrated in FIG. 3 would be applicable to any type of clients of the storage system 104.

In one embodiment, the storage system 104 can receive backups in data streams 305 from client 101, and store the backups via the global compression process. The data streams 305 represent different types of backup data (e.g., full backup data or incremental backup data) from the database system 301. Metadata of each backup data from the database system 301 can be stored in the metadata 110.

As shown in the FIG. 3, the metadata 110 can include a local compression ratio and a global compression ratio for each backup from the database system 301. The global compression ratio is a ratio between an uncompressed size of a data stream and a compressed size of the data stream, and the local compression ratio is a ratio between an uncompressed size of unique data segments in the data stream and a compressed size of the unique data segments in the data stream.

In one embodiment, backups from client 101 are tagged, which enables the storage system 104 to filter and list files (backups) generated by the client. Other methods used to track compression history of a backup lineage can include:

Method 1: Given a backup file, client 101 tracks the lineage for that backup file in its catalog. Since this method requires the lineage data to determine the history of the compression ratios, the storage system 104 could request the information from the client 101.

Method 2: For Virtual Synthetic files, the lineage information can be embedded in the metadata 110 or another storage location. The storage system 104 can walk up the lineage tree using the VS metadata, and determine the historical compression ratios.

Method 3: Using the metadata 110, the backup files can be tagged with the client ID. The latest n files with the same client id can be obtained in a filesystem namespace tree using a depth first search in the Btree and sorting the search result by the modified timestamp (mtime) information.

In one embodiment, the local compression ratio can be used to deduce information about a given data stream. For example, if the local compression on the data stream is near zero or negative, then then the data stream is either compressible, pre-compressed, or encrypted. If the global compression ratio of a given data stream is near zero, then the data stream may be a first generation of data that lands on the storage system 104, or encrypted (unless the data stream is segmented using the FSS). However, the deduced information itself may not be not enough for the compression/encryption detector 306 to detect abnormalities in compression patterns.

Thus, the compression/encryption detector 306 uses machine learning techniques to identify a sudden change in compression ratios of backup data from the client 101 over particular period of time in the past. The particular period of time can be configured by the system administrator of the deduplication storage system 300. For example, the period of time can be 7 days or 10 days or 30 days. The historical data is used to create a historical context for determining whether a particular slope change is considered abnormal.

For example, Table 1 lists the sizes of three backups from client 101, and their local compression ratios and global compression ratios.

TABLE 1

| Client ID 1 (i.e., client 101) | Local compression Ratio | Global compression (deduplication ratio) | Size of the backup file. |
|---|---|---|---|
| Backup 1 | 2 | 6.7 | 100 GB |
| Backup 2 | 2 | 6.65 | 102 GB |
| Backup 3 | 1.92 | 6.8 | 103 GB |

As shown in Table 1, the local compression ratios for the three backups are respectively 2, 2, and 1.92, which are very close to each other. So are the global compression ratios for the three backups, which are respectively 6.7, 6.65, and 6.8.

If the compression function is suddenly turned on this client, either inadvertently by the database administer, or intentionally by a ransomware, the local compression ratio and the global compression ratio of a new data stream would be as follows as shown in Table 2:

TABLE 2

| Client ID 1 (e.g., client 101) | Local compression Ratio | Global compression (Dedupe Ratio) | Size of the backup file |
|---|---|---|---|
| Backup n | 1.01 | 0.99 | 103 GB |

As shown above, both the local compression ratio and the global compression ratio of the backup n—which is received from client 101 after the compression function is turned on client 101—is drastically smaller than the corresponding compression ratios shown in Table 1.

Referring back to FIG. 1, the compression/encryption abnormality detector 306 can plot a local compression ratio curve using historical local compression ratios in a predetermined period of time in the past, and plot a global compression ratio curve using global compression ratios in the same predetermined period of time.

The local compression curve can be smoothened using a local compression smoother 309, and the global compression ratio curve can be smoothened using a global compression ratio smoother 311. Each of the local compression ratio smoother 309 and the global compression ratio smoother 311 can implement one of many smoothing algorithms, such as Savitzky-Golay filter.

An abnormality evaluator 315 can take a second derivative of each data point on the smoothened local compression curve to generate a second derivative curve for the local compression ratios, and take a second derivative of each data point on the smoothened global compression ratio curve to generate a second derivative curve for the global compression ratios. The abnormality evaluator 315 then identifies a slope (i.e. rate of change) for each data point on the second derivative curve for the local compression ratios and the second derivative curve for the global compression ratios. The abnormality evaluator 315 can identify any data point whose slope exceeds a predetermined threshold by comparing the slope of that data point with the threshold. In one embodiment, the threshold can be determined based on different datasets, or based on feedbacks from system administrators.

A data point with such a slope change can be identified as a data point with abnormality. In one embodiment, the change can be a change in amplitude of the curve in either direction. The threshold used to identify abnormalities can be configured by the administrator of the deduplication storage system 300. Such an abnormality can be an indication that the corresponding backup is encrypted or compressed In one embodiment, once a particular data point is identified as having an abnormality, the compression/encryption abnormality detector 306 can match the data point to a particular backup using the metadata 110, and generates an alert message for display on a graphical user interface 317 to notify the administrator of the deduplication storage system 300 of the abnormality. Meanwhile, the compression/encryption abnormality detector 306 can send an alert message to the administrator of client 101, such that both the administrator of client 101 and the administrator of the deduplication storage system 300 can take appropriate corrective actions if necessary.

Figure 4A:
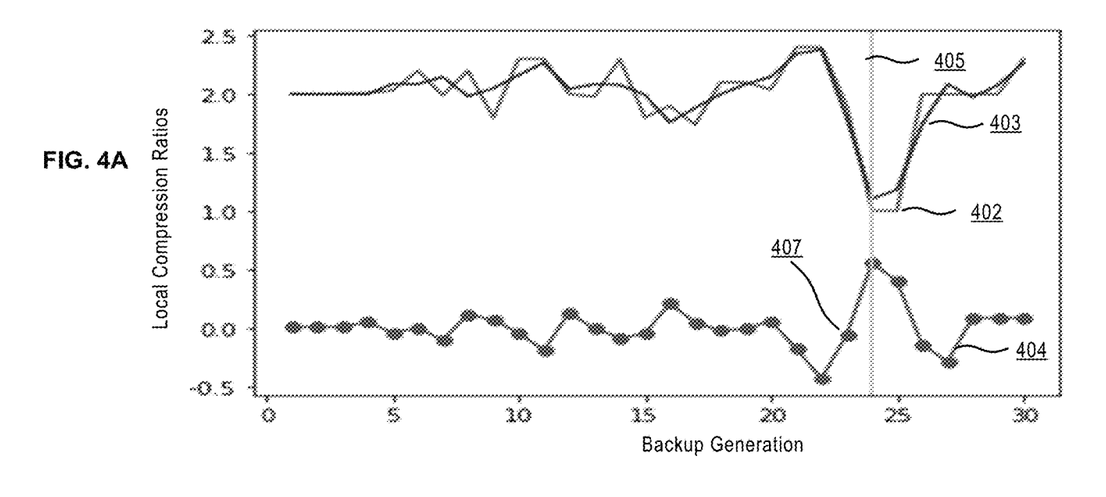
FIGS. 4A-4B illustrate an example of detecting a compression and/or encryption in data streams of a client according to one embodiment of the invention.
Figure 4B:
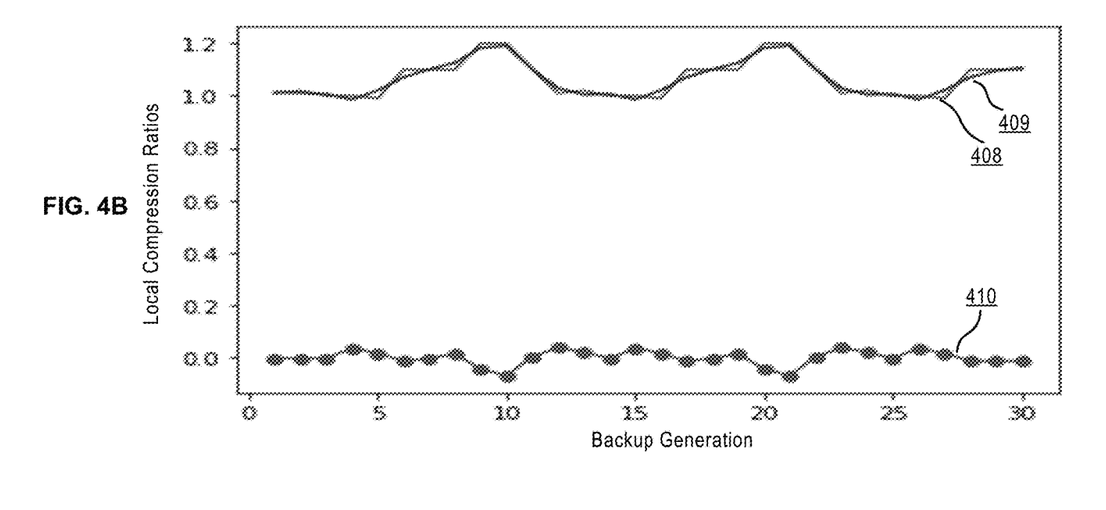

FIGS. 4A-4B illustrate an example of detecting a compression and/or encryption in data streams of a client according to one embodiment of the invention. FIGS. 4A-4B uses local compression ratios to illustrate how an abnormality in compression ratios is detected. The machine learning techniques used in FIGS. 4A-4B can be similarly applied to global compression ratios to detect an abnormality in the global compression ratios.

As shown in FIG. 4A, on a plotted curve 402 is generated by connecting all the data points during the past 30 days, each data point representing a local compression ratio of a backup, and the local compression ratios during the past 30 hovering around 2.0. The plotted curve 402 is smoothened into a smoothened curve 403. A curve 404 is then generated from the smoothened curve 403 by taking a second derivative of each data point on the smoothened curve 403. A line 405 marks a data point where an abnormality in the corresponding local compression ratio has a change that exceeds a predetermined threshold.

FIG. 4B shows a different plotted curve 408 using local compression ratios over the past 30 days, a different smoothened curve 409, and a different second derivative curve 410 of the smoothened curve 409.

However, in FIG. 4B, no data point is identified as having an abnormality in its local compression ratio, because the local compression ratios during the past 30 days were always close to 1, and no data point has a slope change that exceeds a predetermined threshold.

FIGS. 4A-4B is an illustrative example of detecting abnormal local compressions in data streams. It is for the purpose of demonstrating the process of detecting such an abnormality. In actual implementations, the compression ratio abnormality detector runs periodically (e.g., every 2 hours), and thus would detect compression ratios abnormalities in a data stream as soon as the data stream is deduplicated and stored to the storage system.

Figure 5:
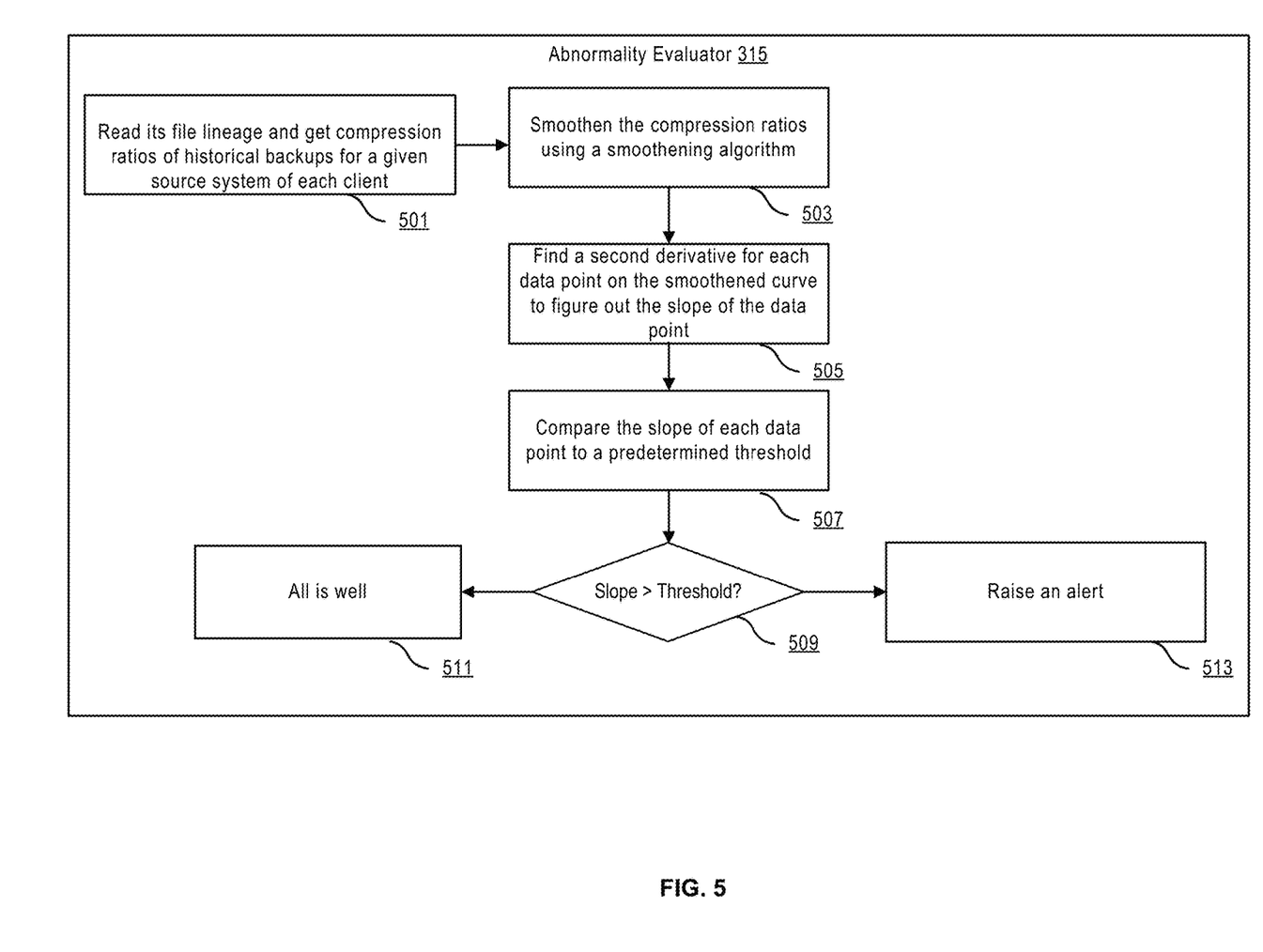
FIG. 5 illustrates a process of detecting abnormalities in data streams according to one embodiment of the invention.

FIG. 5 illustrates a process 500 of detecting abnormalities in data streams according to one embodiment of the invention. Process 500 may be performed by a processing logic which may include software, hardware, or a combination thereof. For example, process 500 may be performed by the compression/encryption abnormality detector 306 described in FIG. 3.

As shown in FIG. 5, in operation 501, the processing logic obtains a file lineage to get compression ratios of historical backups for a given source system for each client. The compression ratios are stored in a deduplication storage system, and can include both global compression ratios and local compression ratios of historical backups of the source system of the client. In one example, the source system can be a database or a web application of the client. The compression ratios can be compression rations of backups of the source system for a particular period of time (e.g., 10 days) in the past.

In operation 503, the processing logic smoothens the compression ratios using a smoothening algorithm, such as Savitzky-Golay filter. In this operation, the processing logic generates a plotted curve for the global compression ratios and a plotted curve for the local compression ratios, and then smoothens each plotted curve.

In operation 505, the processing logic finds a second derivative of each data point on the smoothed plotted curve for the global compression ratios, and the smoothened plotted curve for the local compression ratios. The second derivative of each data point is the slope of the data point.

In operation 507, the processing logic compares the slope of each data point with a predetermined threshold.

In operation 508, the processing logic determines whether any of the data points has a larger slope than the predetermined threshold. If no such data point is found, then the process logic will do nothing as shown in operation 511. However, if at least one data point whose slope is larger than the threshold is identified, the processing logic generates an alert message for the administrator of the client and an alert message for the administrator of the deduplication storage system as shown in operation 513.

Figure 6:
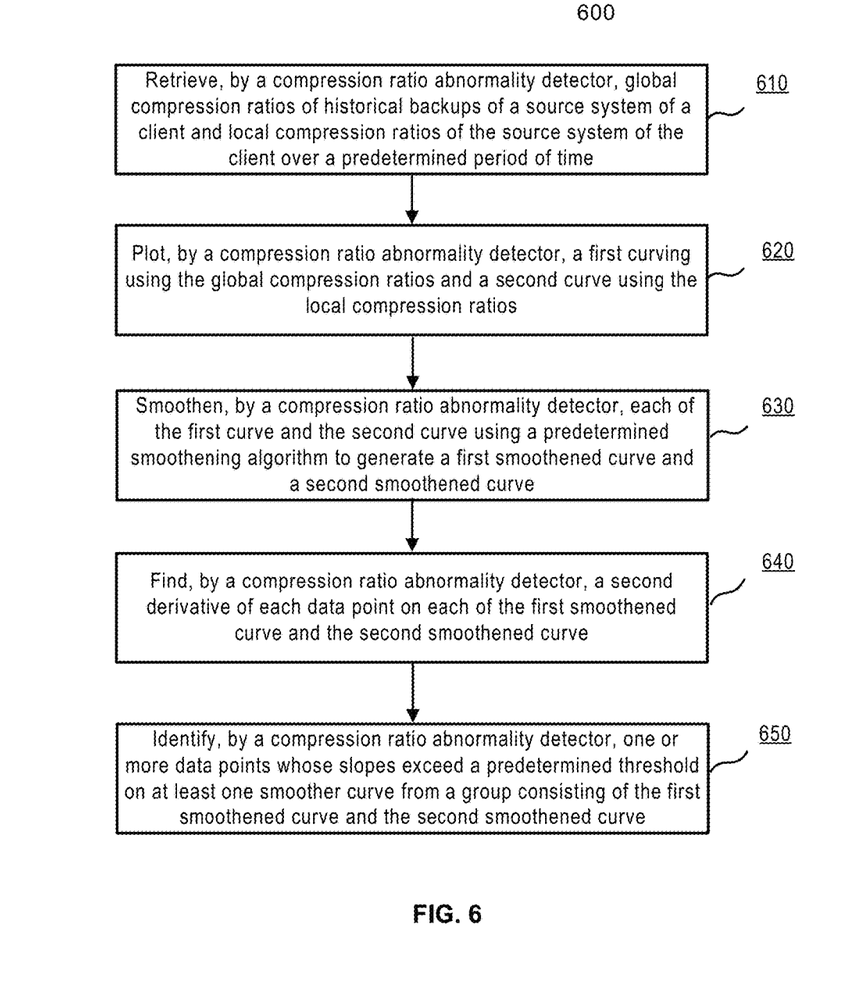
FIG. 6 is a flow diagram illustrating a method of detecting abnormalities in data streams according to one embodiment of the invention.

FIG. 6 is a flow diagram illustrating a process 600 of detecting abnormalities in data streams according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by the processing modules 1528 of FIG. 7 or the compression/encryption abnormality detector 306 described in FIG. 3.

Referring to FIG. 6, in operation 610, the processing logic retrieves global compression ratios of historical backups of a source system of a client and local compression ratios of the source system of the client over a predetermined period of time. In operation 620, the processing logic plots a first curve using the global compression ratios and a second curve using the local compression ratios. In operation 630, the processing logic smoothens each of the first curve and the second curve using a predetermined smoothening algorithm to generate a first smoothened curve and a second smoothened curve. In operation 640, the processing logic finds a second derivative of each data point on each of the first smoothened curve and the second smoothened curve. In operation 650, the processing logic identifies one or more data points whose slopes exceed a predetermined threshold on at least one smoothened curve from a group consisting of the first smoothened curve and the second smoothened curve.

Figure 7:
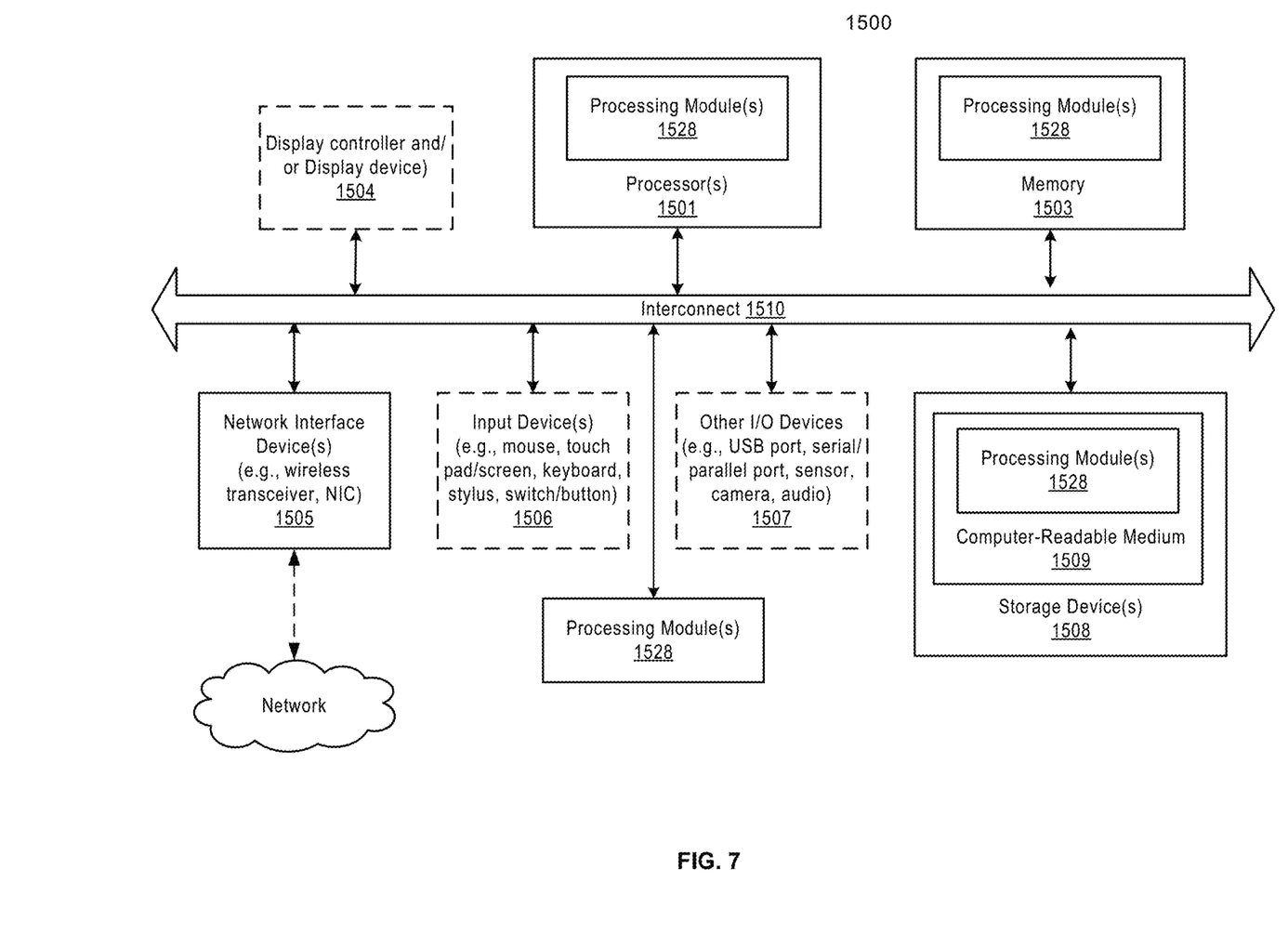
FIG. 7 is a block diagram illustrating an example of a data processing system which may be used with one embodiment of the invention.

FIG. 7 is a block diagram illustrating an example of a data processing system 1500 which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a FaaS module, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of identifying an abnormality in data streams in a deduplication storage system, comprising:
    retrieving, by a compression ratio abnormality detector, global compression ratios of historical backups of a source system of a client and local compression ratios of the source system of the client over a predetermined period of time;
    plotting, by a compression ratio abnormality detector, a first curve using the global compression ratios and a second curve using the local compression ratios;
    smoothening, by a compression ratio abnormality detector, each of the first curve and the second curve using a predetermined smoothening algorithm to generate a first smoothened curve and a second smoothened curve;
    finding, by a compression ratio abnormality detector, a second derivative of each data point on each of the first smoothened curve and the second smoothened curve;
    identifying, by a compression ratio abnormality detector, one or more data points whose slopes exceed a predetermined threshold on at least one smoothened curve from a group consisting of the first smoothened curve and the second smoothened curve; and
    generating an alert message for at least one administrator selected from a group consisting of an administrator of the client and an administrator of the deduplication storage system, wherein the alert message is to inform the at least one administrator that a compression function or that an encryption function has been enabled on the client.

2. The computer-implemented method of claim 1, wherein the deduplication storage system includes a graphical user interface that displays the alert message.

3. The computer-implemented method of claim 1, wherein the predetermined smoothening algorithm is one of Savitzky-Golay filter, kernel density estimation, and quadratic planning (QP) spline optimization.

4. The computer-implemented method of claim 1, wherein the predetermined threshold is configurable.

5. The computer-implemented method of claim 1, wherein the predetermined period of time is equal to or less than 30 days.

6. A non-transitory machine-readable medium having instructions stored therein, which when executed by a processor, cause the processor to perform operations of identifying an abnormality in data streams in a deduplication storage system, the operations comprising:

retrieving global compression ratios of historical backups of a source system of a client and local compression ratios of the source system of the client over a predetermined period of time;

plotting a first curve using the global compression ratios and a second curve using the local compression ratios;

smoothening each of the first curve and the second curve using a predetermined smoothening algorithm to generate a first smoothened curve and a second smoothened curve;

finding a second derivative of each data point on each of the first smoothened curve and the second smoothened curve;

identifying one or more data points whose slopes exceed a predetermined threshold on at least one smoothened curve from a group consisting of the first smoothened curve and the second smoothened curve; and generating an alert message for at least one administrator selected from a group consisting of an administrator of the client and an administrator of the deduplication storage system, wherein the alert message is to inform the at least one administrator that a compression function or that an encryption function has been enabled on the client.

7. The non-transitory machine-readable medium of claim 6, wherein the deduplication storage system includes a graphical user interface that displays the alert message.

8. The non-transitory machine-readable medium of claim 6, wherein the predetermined smoothening algorithm is one of Savitzky-Golay filter, kernel density estimation, and quadratic planning (QP) spline optimization.

9. The non-transitory machine-readable medium of claim 6, wherein the predetermined threshold is configurable.

10. The non-transitory machine-readable medium of claim 6, wherein the predetermined period of time is equal to or less than 30 days.

11. A data processing system, comprising:
a processor; and
a memory coupled to the processor to store instructions, which when executed by the processor, cause the processor to perform operations of identifying an abnormality in data streams in a deduplication storage system, the operations comprising:

retrieving global compression ratios of historical backups of a source system of a client and local compression ratios of the source system of the client over a predetermined period of time, plotting a first curve using the global compression ratios and a second curve using the local compression ratios, smoothening each of the first curve and the second curve using a predetermined smoothening algorithm to generate a first smoothened curve and a second smoothened curve, finding a second derivative of each data point on each of the first smoothened curve and the second smoothened curve, identifying one or more data points whose slopes exceed a predetermined threshold on at least one smoothened curve from a group consisting of the first smoothened curve and the second smoothened curve, and generating an alert message for at least one administrator selected from a group consisting of an administrator of the client and an administrator of the deduplication storage system, wherein the alert message is to inform the at least one administrator that a compression function or that an encryption function has been enabled on the client.

12. The data processing system of claim 11, wherein the deduplication storage system includes a graphical user interface that displays the alert message.

13. The data processing system of claim 11, wherein the predetermined smoothening algorithm is one of Savitzky-Golay filter, kernel density estimation, and quadratic planning (QP) spline optimization.

14. The data processing system of claim 11, wherein the predetermined threshold is configurable.

* * * * *